United States Patent
Yang et al.

(10) Patent No.: US 8,482,551 B2
(45) Date of Patent: Jul. 9, 2013

(54) DISPLAY SYSTEM

(75) Inventors: Ssu-Chieh Yang, Tainan County (TW); Yaw-Guang Chang, Tainan County (TW); Hsien-Ting Huang, Tainan County (TW)

(73) Assignee: Himax Technologies Limited, Fonghua Village, Xinshi Dist., Tainan (TW)

( * ) Notice: Subject to any disclaimer, the term of this patent is extended or adjusted under 35 U.S.C. 154(b) by 288 days.

(21) Appl. No.: 12/691,698

(22) Filed: Jan. 21, 2010

(65) Prior Publication Data

US 2010/0118011 A1  May 13, 2010

Related U.S. Application Data

(63) Continuation-in-part of application No. 12/370,585, filed on Feb. 12, 2009.

(60) Provisional application No. 61/109,193, filed on Oct. 29, 2008.

(51) Int. Cl.
*G06F 3/038* (2006.01)
*G09G 3/36* (2006.01)

(52) U.S. Cl.
USPC .............................. 345/208; 345/94; 345/102

(58) Field of Classification Search
USPC ............................................ 345/208, 94, 102
See application file for complete search history.

(56) References Cited

U.S. PATENT DOCUMENTS

| 6,862,015 | B2 | 3/2005 | Fujioka |
| 7,110,274 | B1 | 9/2006 | Endo |
| 7,167,154 | B2 | 1/2007 | Sato |
| 7,212,182 | B2 * | 5/2007 | Chiang et al. ................... 345/92 |
| 2003/0011586 | A1 | 1/2003 | Nakajima |
| 2005/0099374 | A1 | 5/2005 | Sagawa |
| 2006/0012585 | A1 | 1/2006 | Schoofs |
| 2007/0024564 | A1 * | 2/2007 | Shimizu .......................... 345/98 |
| 2007/0132678 | A1 * | 6/2007 | Wei et al. ......................... 345/82 |

(Continued)

FOREIGN PATENT DOCUMENTS

| CN | 1410813 A | 4/2003 |
| CN | 1419733 A | 5/2003 |

(Continued)

OTHER PUBLICATIONS 1.5x/2x High-Efficiency White LED Charge Pumps, MAX1910/MAX1912 datasheet Rev 2, 2004 Maxim Integrated Products, MAXIM, Mar. 2004, pp. 1-11.

(Continued)

*Primary Examiner* — Joseph Feild
*Assistant Examiner* — Andrew Sasinowski
(74) *Attorney, Agent, or Firm* — Winston Hsu; Scott Margo

(57) ABSTRACT

A display system includes a display device, a driving circuit, a flexible printed circuit (FPC), a charge pump circuit and a control circuit. The driving circuit is disposed on the display device, for driving the display device. The FPC is externally coupled to the display device. The charge pump circuit is disposed on the FPC, for generating at least an output voltage to the driving circuit. The control circuit is disposed on the display device and coupled to the driving circuit, for generating a plurality of control signals to control the charge pump circuit. The charge pump circuit has a plurality of control ports coupled to the control circuit for receiving the control signals generated from the control circuit, respectively.

11 Claims, 4 Drawing Sheets

U.S. PATENT DOCUMENTS

2007/0229447 A1* 10/2007 Takahara et al. .............. 345/102
2008/0036752 A1 2/2008 Diab
2008/0084410 A1* 4/2008 Uehara ...................... 345/211

FOREIGN PATENT DOCUMENTS

| CN | 1664887 A | 9/2005 |
|---|---|---|
| CN | 101064467 A | 10/2007 |
| CN | 101136586 A | 3/2008 |
| JP | 2004343893 A | 12/2004 |
| JP | 2007233202 A | 9/2007 |
| TW | 200424995 | 11/2004 |
| TW | 200826052 | 6/2008 |
| TW | 200837708 | 9/2008 |

OTHER PUBLICATIONS

Dragan Maksimović et al., "Switched-Capacitor DC-DC Converters for Low-Power On-Chip Applications", 1999 IEEE, Aug. 6, 1999, vol. 1, pp. 54-59.

Switched-Capacitor voltage Doublers, MAX1682/MAX1683 datasheet Rev 2, 2000 Maxim Integrated Products, MAXIM, Sep. 2000, pp. 1-8.

Switched-Capacitor voltage Inverters, MAX828/MAX829 datasheet Rev 3, 1999 Maxim Integrated Products, MAXIM, Sep. 1999, pp. 1-8.

* cited by examiner

DISPLAY SYSTEM

CROSS REFERENCE TO RELATED APPLICATIONS

This application is a continuation-in-part of co-pending U.S. application Ser. No. 12/370,585, filed on Feb. 12, 2009, which claims the benefit of U.S. provisional application No. 61/109,193, filed on Oct. 29, 2008, the contents thereof being incorporated herein by reference.

BACKGROUND OF THE INVENTION

1. Field of the Invention

The present invention relates to a display system, and more particularly, to a display system disposing a charge pump circuit on a flexible printed circuit (FPC) externally coupled to its display device for improving its voltage converting efficiency.

2. Description of the Prior Art

A charge pump is a kind of DC to DC converter that uses capacitors as energy storage elements to create either a higher or lower voltage power source. Charge pumps can use some form of switching devices to control the connection of voltages to the capacitor. The charge pumps can also double voltages, triple voltages, halve voltages, invert voltages, fractionally multiply or scale voltages such as x3/2, x4/3, x2/3, etc. and generate arbitrary voltages, depending on the controller and circuit topology.

In traditional small-sized and medium-sized thin-film transistor liquid crystal display (TFT-LCD) devices, with the growing size of the screen, the current consumption is also growing. If the charge pump circuit is disposed in the driving circuit of the TFT-LCD device, its voltage converting efficiency will get worse due to being limited by the indium tin oxide (ITO) resistors.

In addition, since the system end hopes to provide an input voltage ranging from 2.0V to 4.8V to the driving circuit of the TFT-LCD device directly, the charge pump circuit should be able to support a voltage converting ratio with different multiples (such as 1.5 times, 2 times, or 3 times) to provide the desired output voltage.

SUMMARY OF THE INVENTION

It is therefore one of the objectives of the claimed invention to provide a display system to solve the abovementioned problems.

According to an embodiment, a display system is provided. The display system includes a display device, a driving circuit, a flexible printed circuit (FPC), a charge pump circuit and a control circuit. The driving circuit is disposed on the display device, for driving the display device. The FPC is externally coupled to the display device. The charge pump circuit is disposed on the FPC, for generating at least an output voltage to the driving circuit. The control circuit is disposed on the display device and coupled to the driving circuit, for generating a plurality of control signals to control the charge pump circuit. The charge pump circuit has a plurality of control ports coupled to the control circuit for receiving the control signals generated from the control circuit, respectively.

According to another embodiment, a display system is provided. The display system includes a display device, a driving circuit, an FPC, a charge pump circuit and a control circuit. The driving circuit is disposed on the display device, for driving the display device. The FPC is externally coupled to the display device. The charge pump circuit is disposed on the FPC, for generating at least an output voltage to the driving circuit. The control circuit is disposed on the display device and coupled to the driving circuit, for generating a control signal to control the charge pump circuit. The charge pump circuit has a first control port coupled to the control circuit for receiving the control signal generated from the control circuit, and a second control port for receiving a reference voltage.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular components. As one skilled in the art will appreciate, hardware manufacturers may refer to a component by different names. This document does not intend to distinguish between components that differ in name but in function. In the following discussion and in the claims, the terms "include", "including", "comprise", and "comprising" are used in an open-ended fashion, and thus should be interpreted to mean "including, but not limited to . . . ". The terms "couple" and "coupled" are intended to mean either an indirect or a direct electrical connection. Thus, if a first device couples to a second device, that connection may be through a direct electrical connection, or through an indirect electrical connection via other devices and connections.

Figure 1:
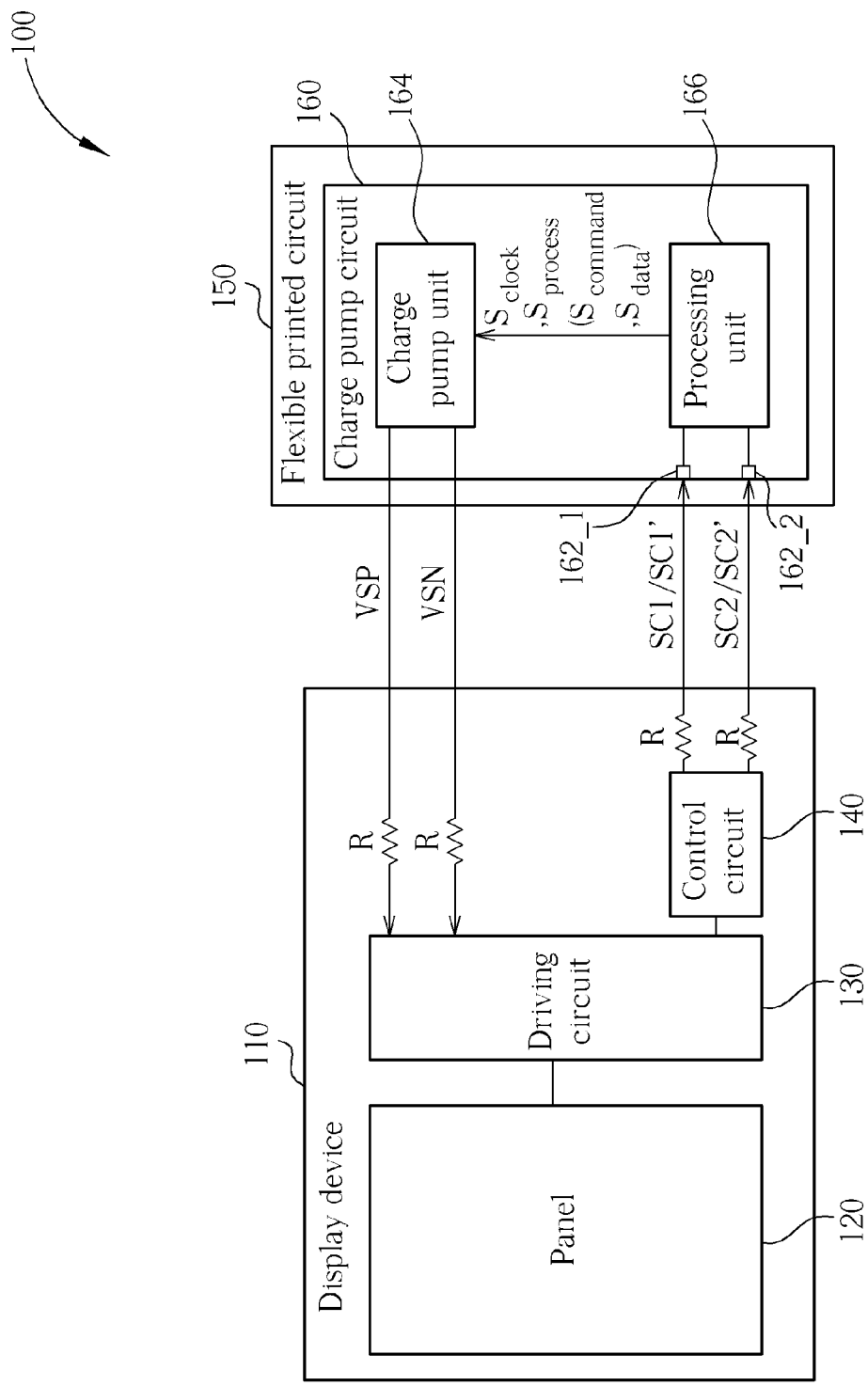
FIG. 1 is a diagram of a display system according to an exemplary embodiment of the present invention.

In a case where the charge pump circuit is moved from the driving circuit of the TFT-LCD device to a flexible printed circuit (FPC), it is necessary to consider how to control operations of the charge pump circuit disposed on the FPC. Please refer to FIG. 1. FIG. 1 is a diagram of a display system 100 according to an exemplary embodiment of the present invention. The display system 100 includes, but is not limited to, a display device 110, a panel 120, a driving circuit 130, a control circuit 140, a flexible printed circuit 150, and a charge pump circuit 160. The panel 120 is disposed on the display device 110. The driving circuit 130 is disposed on the display device 110 for driving the panel 120. The control circuit 140 is also disposed on the display device 110 and coupled to the driving circuit 130, for generating a plurality of control signals, such as SC1/SC1' and SC2/SC2', to control the charge pump circuit 160. The flexible printed circuit 150 is externally coupled to the display device 110. The charge pump circuit 160 is disposed on the flexible printed circuit 150 for generating at least an output voltage to the driving circuit 130 according to the control signals SC1/SC1' and SC2/SC2' generated by the control circuit 140.

In addition, the charge pump circuit 160 includes a plurality of control ports (e.g., 162_1 and 162_2), a charge pump unit 164 and a processing unit 166. In this exemplary embodiment, the control ports 162_1 and 162_2 are coupled to the control circuit 140 for receiving the control signals SC1/SC1' and SC2/SC2' generated from the control circuit 140, respectively. The charge pump unit 164 is used for generating at least the output voltage to the driving circuit 130. The processing unit 166 is coupled between the control ports 162_1, 162_2 and the charge pump unit 164, for receiving the control signals SC1/SC1' and SC2/SC2' generated from the control circuit 140 via the control ports 162_1 and 162_2, and controlling the charge pump unit 164 according to the control signals SC1/SC1' and SC2/SC2'. The charge pump circuit 160 sets a pumping factor PF1 and generates two output voltages VSP and VSN according to the control signals SC1/SC1', SC2/SC2', wherein the output voltages VSP and VSN are transmitted to the driving circuit 130 for usage. Operations of the control circuit 140 and the charge pump circuit 160 will be detailed using certain figures and embodiments.

Figure 2:
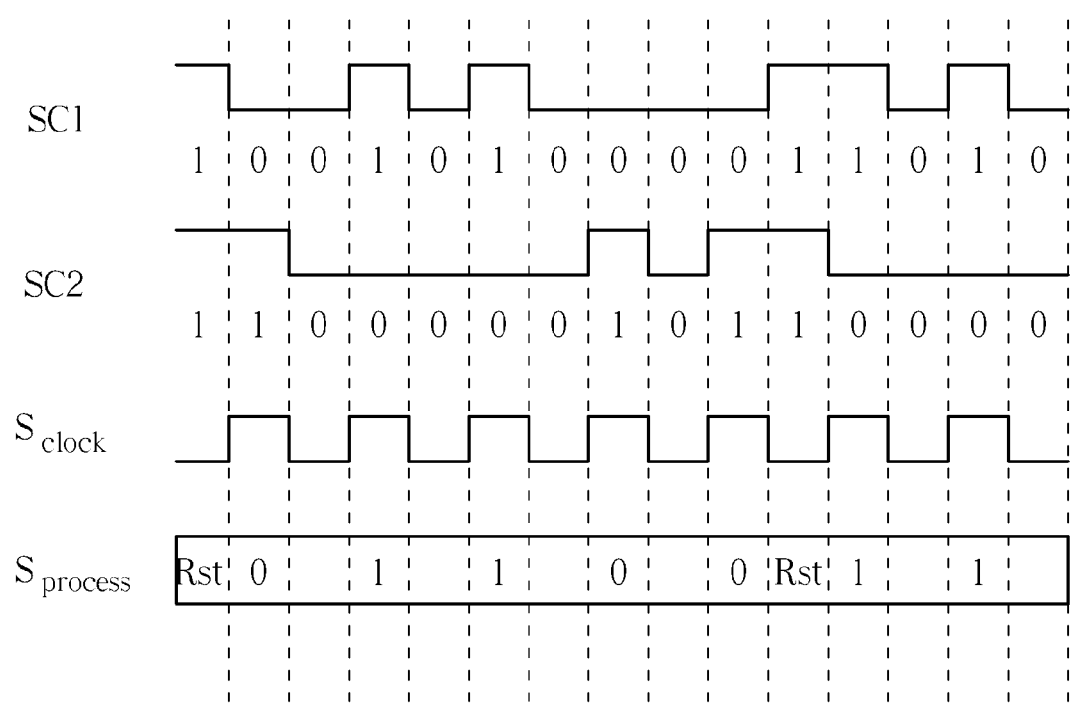
FIG. 2 is a timing diagram illustrating two control signals, a clock signal and a process signal, respectively.

Please note that, for clarity and simplicity, this embodiment of the present invention will be described in detail with reference to the accompanying drawings. It is to be noted, however, that the present invention is not limited thereto. Please refer to FIG. 2 in conjunction with FIG. 1. FIG. 2 is a timing diagram illustrating the control signals SC1 and SC2, a clock signal $S_{clock}$ and a process signal $S_{process}$, respectively. The control circuit 140 generates the control signals SC1, SC2 to control the charge pump circuit 160 according to the requirements of the driving circuit 130. The processing unit 166 of the charge pump circuit 160 receives the control signals SC1, SC2 via the control ports 162_1, 162_2 and performs an exclusive or (XOR) operation upon the received control signals SC1, SC2 to generate the clock signal $S_{clock}$ shown in FIG. 2 to the charge pump unit 164. The processing unit 166 selectively generates data signals or command signals to the charge pump unit 164 according to the received control signals SC1, SC2. For example, as shown in FIG. 2, the processing unit 166 generates a reset signal when the control signals SC1, SC2 are all at logic "1", but this should not be construed as a limitation of the present invention, in another embodiment, the processing unit 166 can generate a reset signal when the control signals SC1, SC2 are all at logic "0"; when the control signal SC1 is at logic "0" and the control signal SC2 is at logic "1", the processing unit 166 sets logic "0" in the process signal $S_{process}$; and when the control signal SC1 is at logic "1" and the control signal SC2 is at logic "0", the processing unit 166 sets logic "1" in the process signal $S_{process}$. Therefore, the processing unit 166 derives the process signal $S_{process}$ (e.g., the logic value "01100" shown in FIG. 2) between the two reset command signals, where the process signal $S_{process}$ can be a data signal or a command signal. And the charge pump circuit 160 can set the pumping factor PF1 and generate the two output voltages VSP and VSN according to the clock signal $S_{clock}$ and the process signal $S_{process}$. For example, in this embodiment, the charge pump circuit 160 sets the pumping factor PF1 to 3/2 according to the process signal $S_{process}$ with logic value "01100".

Figure 3:
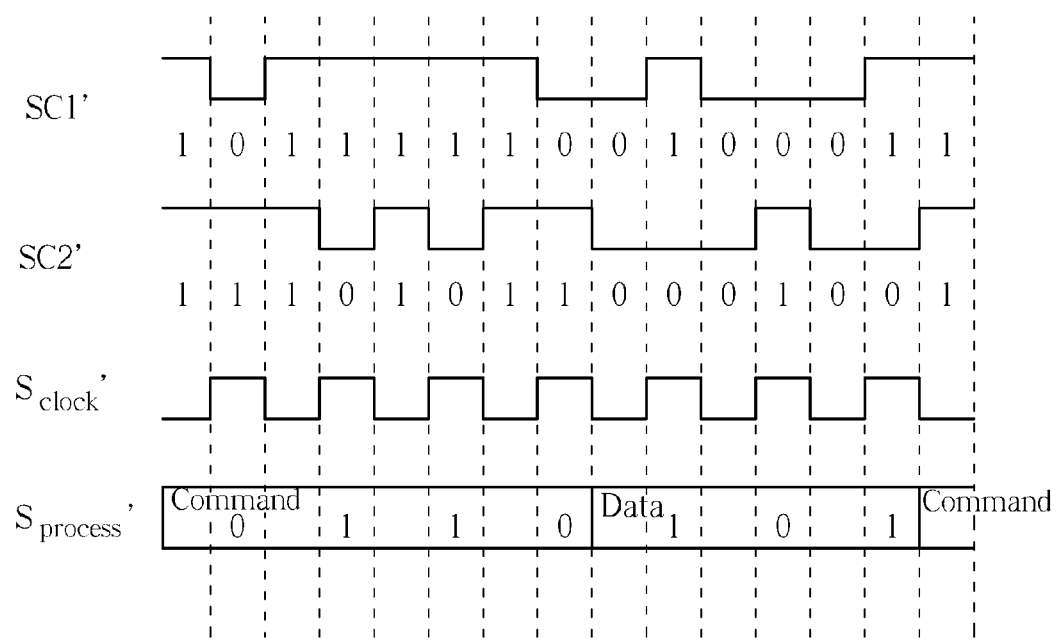
FIG. 3 is a timing diagram illustrating another two control signals, a clock signal and a process signal, respectively.

In another embodiment of the present invention, the control circuit 140 generates another two control signals SC1', SC2' to control the charge pump circuit 160. Please refer to FIG. 3 in conjunction with FIG. 1. FIG. 3 is a timing diagram illustrating the control signals SC1' and SC2', a clock signal $S_{clock}'$ and a process signal $S_{process}'$, respectively. The processing unit 166 receives the control signals SC1', SC2' via the control ports 162_1, 162_2 and performs an exclusive or (XOR) operation upon the received control signals SC1', SC2' to generate the clock signal $S_{clock}'$ shown in FIG. 3 to the charge pump unit 164. The processing unit 166 selectively generates data signals or command signals to the charge pump unit 164 according to the received control signals SC1', SC2'. For example, the processing unit 166 can generate a command signal $S_{command}$ when the control signals SC1', SC2' are all at logic "1"; and then, when the control signal SC1' is at logic "0" and the control signal SC2' is at logic "1", the processing unit 166 sets logic "0" in the command signal $S_{command}$; when the control signal SC1' is at logic "1" and the control signal SC2' is at logic "0", the processing unit 166 sets logic "1" in the command signal $S_{command}$. The processing unit 166 can generate a data signal $S_{data}$ when the control signals SC1', SC2' are all at logic "0"; and then, when the control signal SC1' is at logic "0" and the control signal SC2' is at logic "1", the processing unit 166 sets logic "0" in the data signal $S_{data}$; and when the control signal SC1' is at logic "1" and the control signal SC2' is at logic "0", the processing unit 166 sets logic "1" in the data signal $S_{data}$. Therefore, the processing unit 166 can derive the command signal $S_{command}$ (e.g., the logic value "0110" shown in FIG. 3) and the data signal $S_{data}$ (e.g., the logic value "101" shown in FIG. 3) as desired. And the charge pump circuit 160 can set the pumping factor PF1 and generate the two output voltages VSP and VSN according to the clock signal $S_{clock}'$, the command signal $S_{command}$ and the data signal $S_{data}$. For example, in this embodiment, the charge pump circuit 160 sets the pumping factor PF1 to 4/3 according to the command signal $S_{command}$ with logic value "0110".

As can be seen from FIG. 1, the charge pump circuit 160 is disposed on the flexible printed circuit 150, but not in the driving circuit 130 of the display device 110. Therefore, the voltage converting efficiency of the charge pump circuit 160 can be substantially improved due to not being limited by the indium tin oxide (ITO) resistors R. Furthermore, only two control signals SC1 (SC1') and SC2 (SC2') (please note that the number of the control signals is adjustable according to design requirements) are needed to control the voltage converting ratio of the charge pump circuit 160, which minimizes the pin number of the charge pump circuit 160 to achieve a goal of lowering cost.

Please note that the abovementioned display device 110 can be a thin-film transistor liquid crystal display (TFT-LCD) device and the driving circuit 130 can be a TFT-LCD driver IC, but this should not be construed as a limitation of the present invention. In addition, the number of the control lines is not limited.

Figure 4:
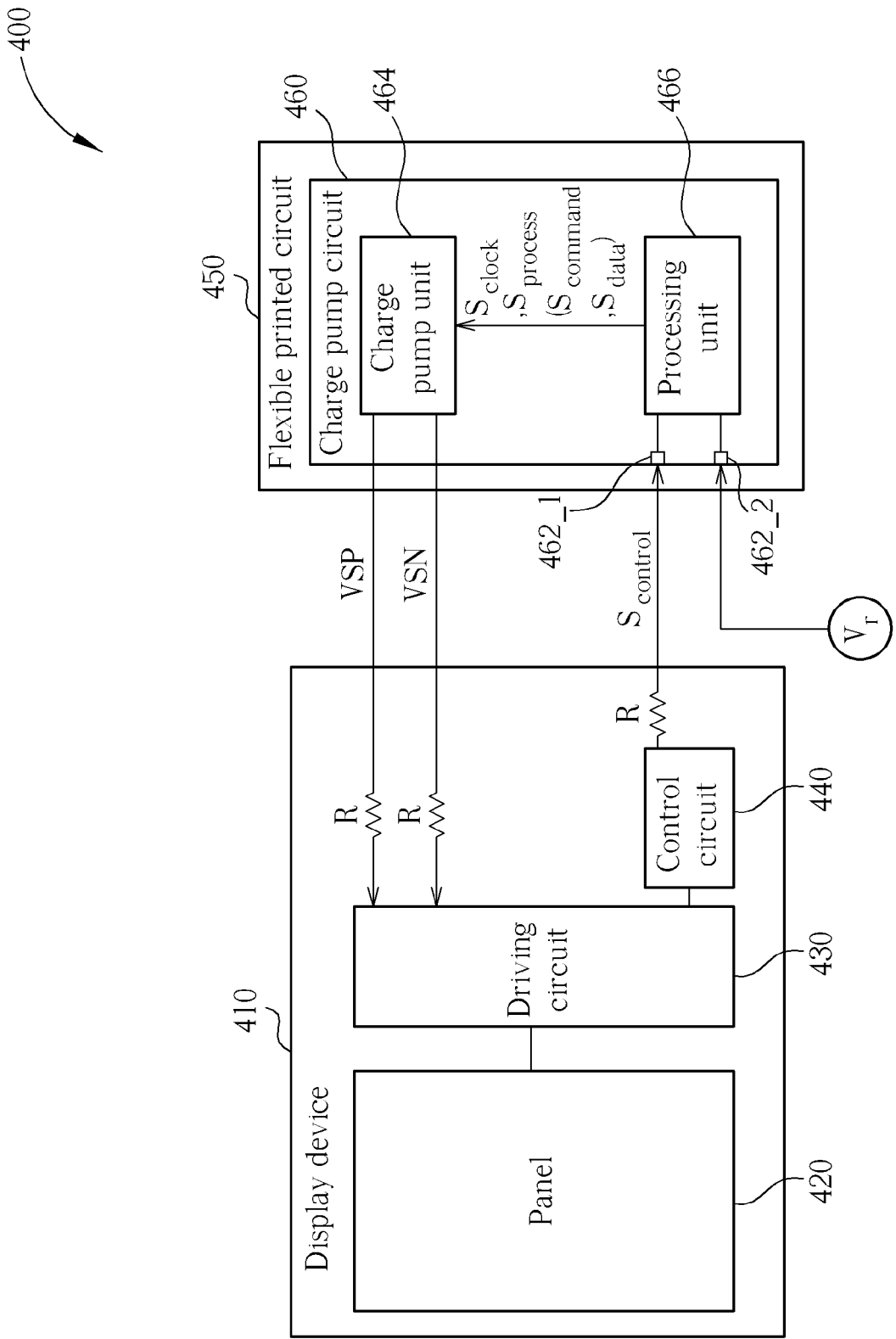
FIG. 4 is a diagram of a display system according to another exemplary embodiment of the present invention.

Please refer to FIG. 4. FIG. 4 is a diagram of a display system 400 according to another exemplary embodiment of the present invention. The difference between the display system 400 and the display system 100 is that one of the control ports 462_1, 462_2 of the charge pump circuit 460 in the display system 400 is coupled to a fixed voltage source Vr (e.g., Vss or Vdd). Therefore, the control circuit 440 merely controls the charge pump circuit 460 via one control signal $S_{control}$. The processing unit 466 provides a clock signal to the charge pump unit 464 according to the control signal $S_{control}$, and sets a pumping factor PF of the charge pump unit 464 according the fixed voltage Vr. For example, if the control ports 462_1 of the charge pump circuit 460 is coupled to a ground referenced voltage source, the pumping factor PF of the charge pump unit 464 can be set to 3/2. As a result, the charge pump 460 can only work in one fixed pumping state.

The abovementioned embodiments are presented merely for describing features of the present invention, and in no way should be considered to be limitations of the scope of the present invention. In summary, the present invention provides a display system disposing a charge pump circuit on a FPC externally coupled to its display device for improving its voltage converting efficiency. The display system utilizes at least two control ports to control the charge pump circuit disposed on the FPC.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display system, comprising:
a display device, which comprises indium tin oxide (ITO) resistors;
a driving circuit, disposed on the display device, for driving the display device;
a flexible printed circuit (FPC), externally coupled to the display device;
a charge pump circuit, disposed only on the FPC, for generating at least an output voltage to the driving circuit; and
a control circuit, disposed on the display device and coupled to the driving circuit, for generating a plurality of control signals to control the charge pump circuit;
wherein the charge pump circuit has a plurality of control ports coupled to the control circuit for receiving the control signals generated from the control circuit, respectively; and
the charge pump circuit is disposed only on the FPC and is coupled to each of the driving circuit and the control circuit through the FPC without being directly connected to any of the driving circuit and the control circuit, so as to prevent a voltage converting efficiency of the charge pump circuit from being limited by the ITO resistors of the display device.

2. The display system of claim 1, wherein the charge pump circuit comprises:
a charge pump unit, for generating at least the output voltage to the driving circuit; and
a processing unit, coupled between the control ports and the charge pump unit, for receiving the control signals generated from the control circuit via the control ports and controlling the charge pump unit according to the control signals.

3. The display system of claim 2, wherein the processing unit performs an exclusive or (XOR) operation upon the received control signals to generate a clock signal to the charge pump unit.

4. The display system of claim 2, wherein the processing unit selectively generates data signals or command signals to the charge pump unit according to the received control signals.

5. The display system of claim 2, wherein the processing unit selectively generates data signals or command signals to the charge pump unit by comparing logic values of the received control signals.

6. The display system of claim 1, wherein the display device is a thin-film transistor liquid crystal display (TFT-LCD) device, and the driving circuit is a TFT-LCD driver IC.

7. A display system, comprising:
a display device, which comprises indium tin oxide (ITO) resistors;
a driving circuit, disposed on the display device, for driving the display device;
a flexible printed circuit (FPC), externally coupled to the display device;
a charge pump circuit, disposed only on the FPC, for generating at least an output voltage to the driving circuit; and
a control circuit, disposed on the display device and coupled to the driving circuit, for generating a control signal to control the charge pump circuit;
wherein the charge pump circuit has a first control port coupled to the control circuit for receiving the control signal generated from the control circuit, and a second control port for receiving a reference voltage; and
the charge pump circuit is disposed only on the FPC and is coupled to each of the driving circuit and the control circuit through the FPC without being directly connected to any of the driving circuit and the control circuit, so as to prevent a voltage converting efficiency of the charge pump circuit from being limited by the ITO resistors of the display device.

8. The display system of claim 7, wherein the charge pump circuit comprises:
a charge pump unit, for generating at least the output voltage to the driving circuit; and
a processing unit, coupled to the first control port, the second control port and the charge pump unit, for receiving the control signal generated from the control circuit via the first control port and the reference voltage via the second control port, and controlling the charge pump unit according to the control signal and the reference voltage.

9. The display system of claim 8, wherein the processing unit provides a clock signal to the charge pump unit according to the control signal, and sets a pumping factor of the charge pump unit according the reference voltage.

10. The display system of claim 7, wherein the reference voltage has a fixed voltage level.

11. The display system of claim 7, wherein the display device is a thin-film transistor liquid crystal display (TFT-LCD) device, and the driving circuit is a TFT-LCD driver IC.

* * * * *